Aug. 6, 1946.  F. G. CREED  2,405,115
FLOATING STRUCTURE
Filed Sept. 10, 1943    5 Sheets-Sheet 3
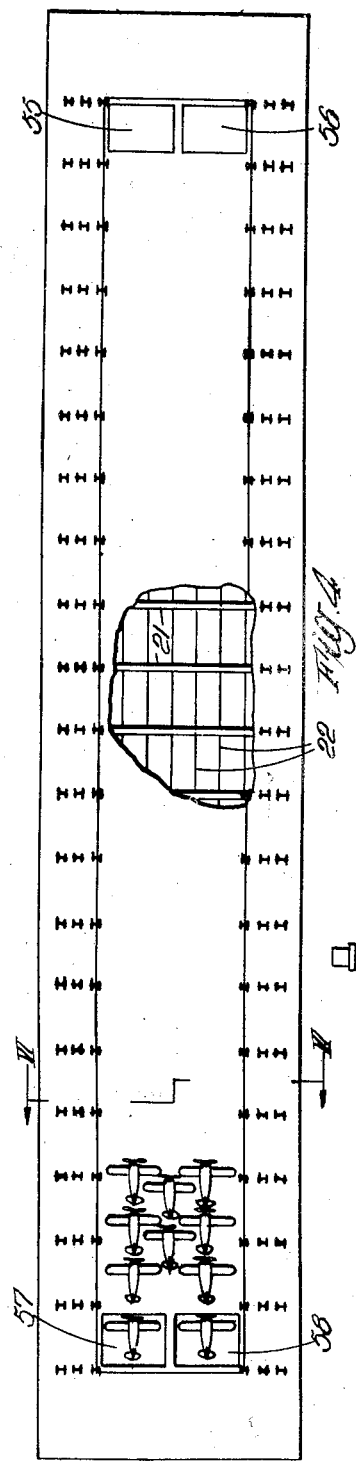
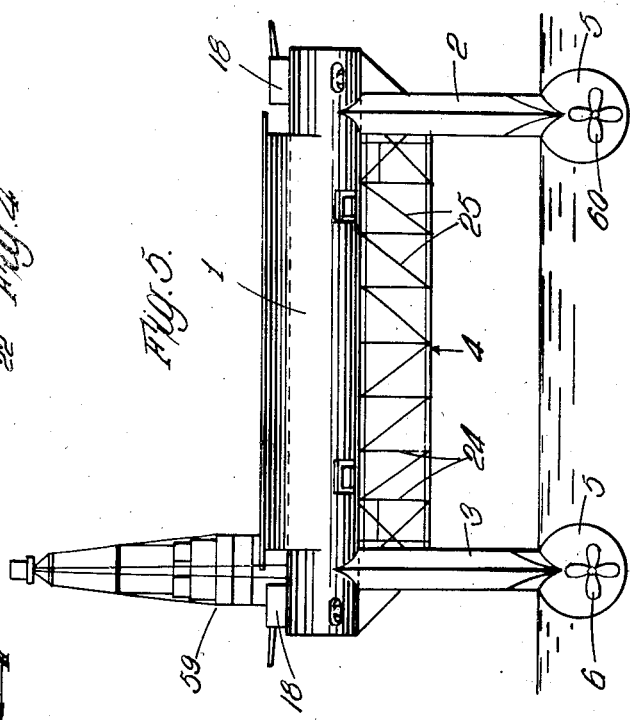
INVENTOR
Frederick George Creed
By
his ATTY.

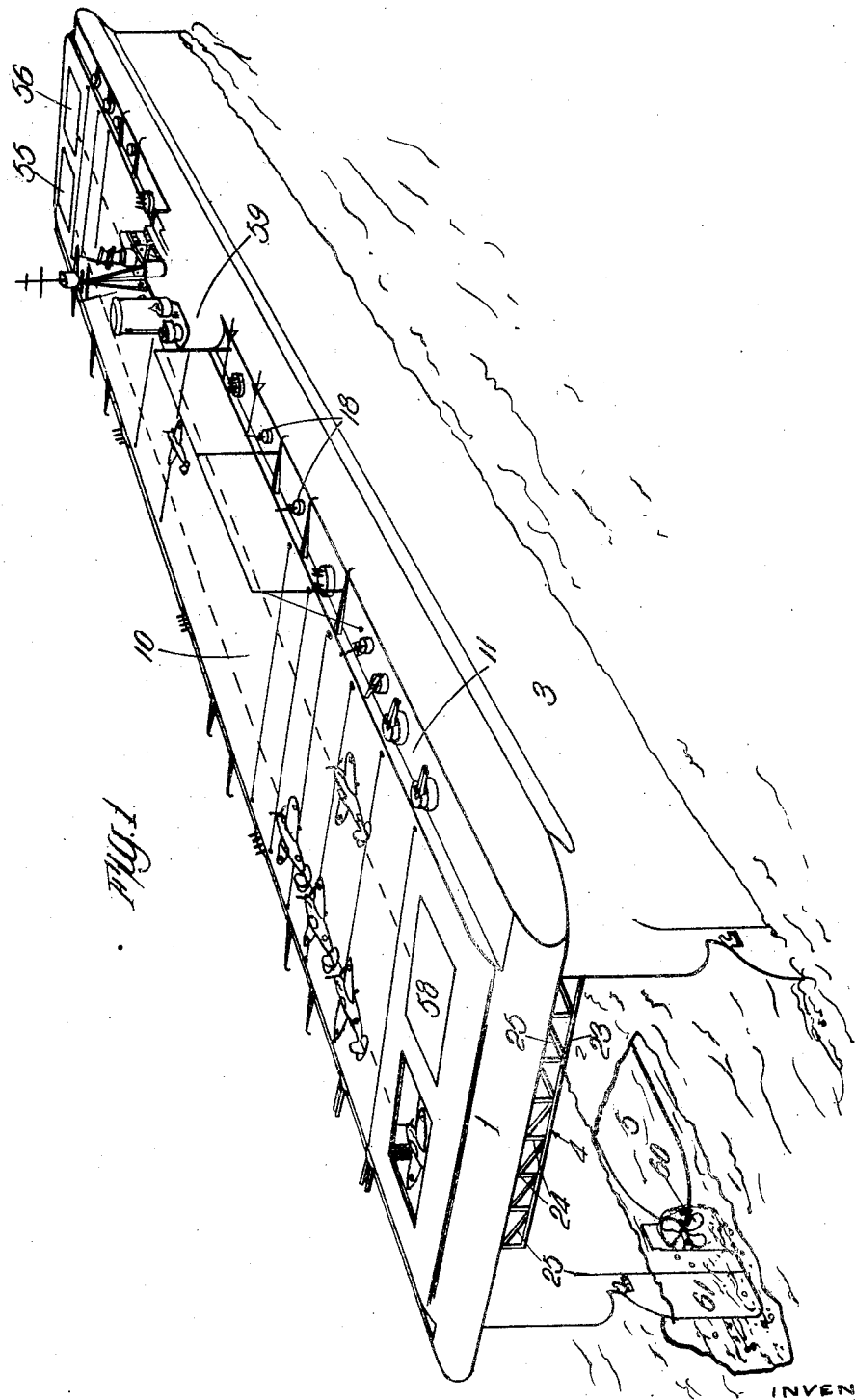

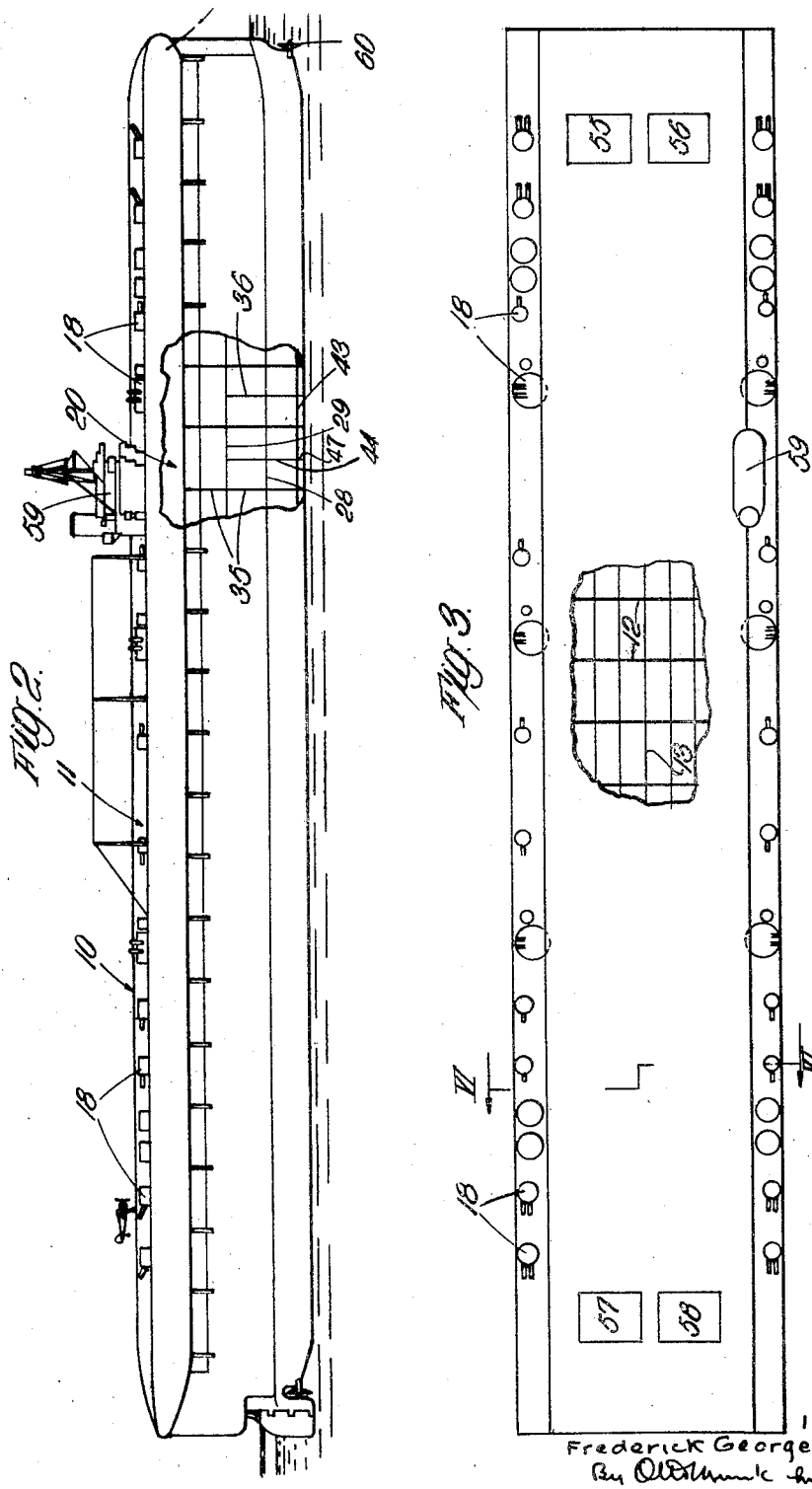

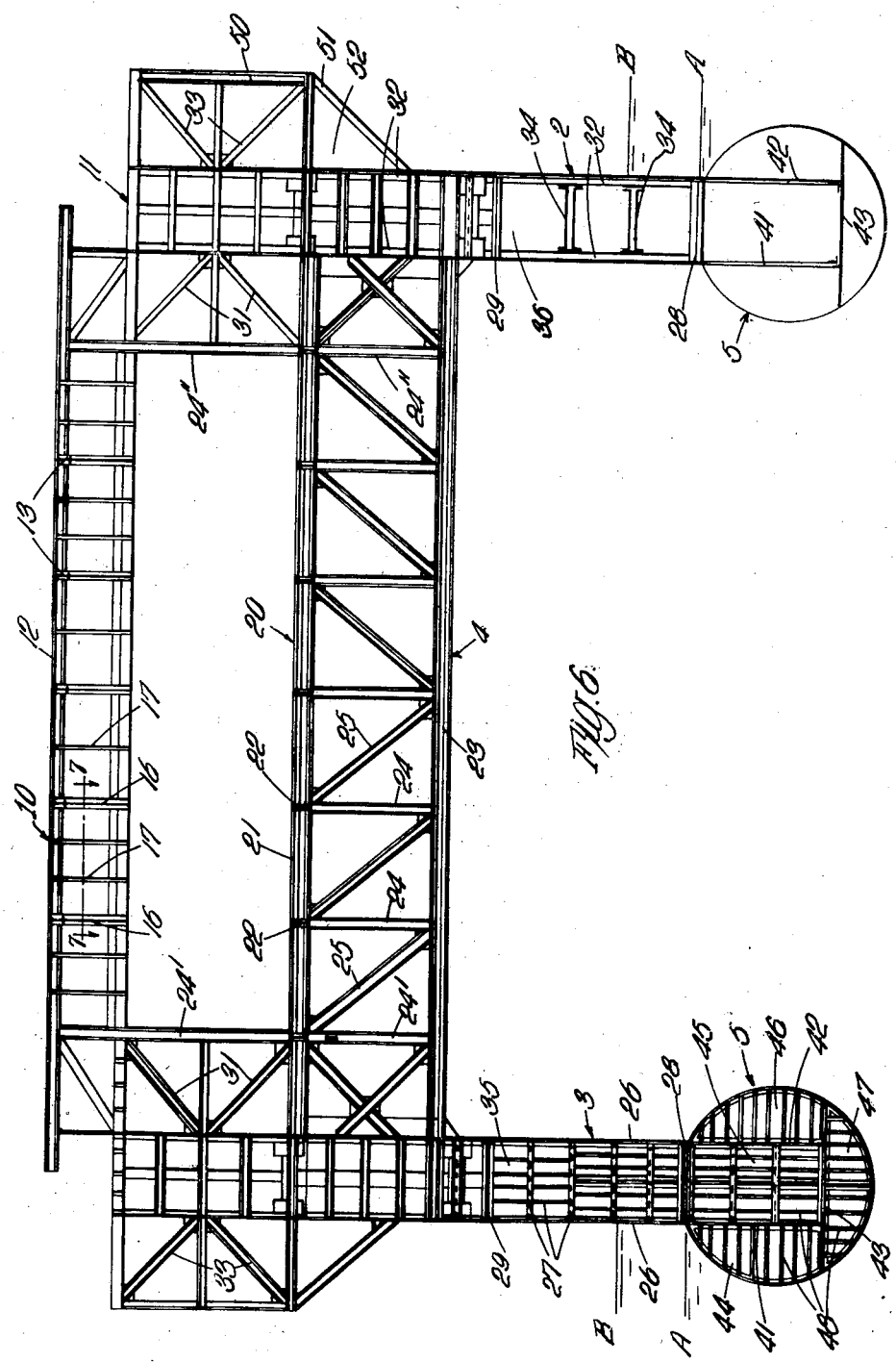

Aug. 6, 1946.   F. G. CREED   2,405,115
FLOATING STRUCTURE
Filed Sept. 10, 1943   5 Sheets-Sheet 5
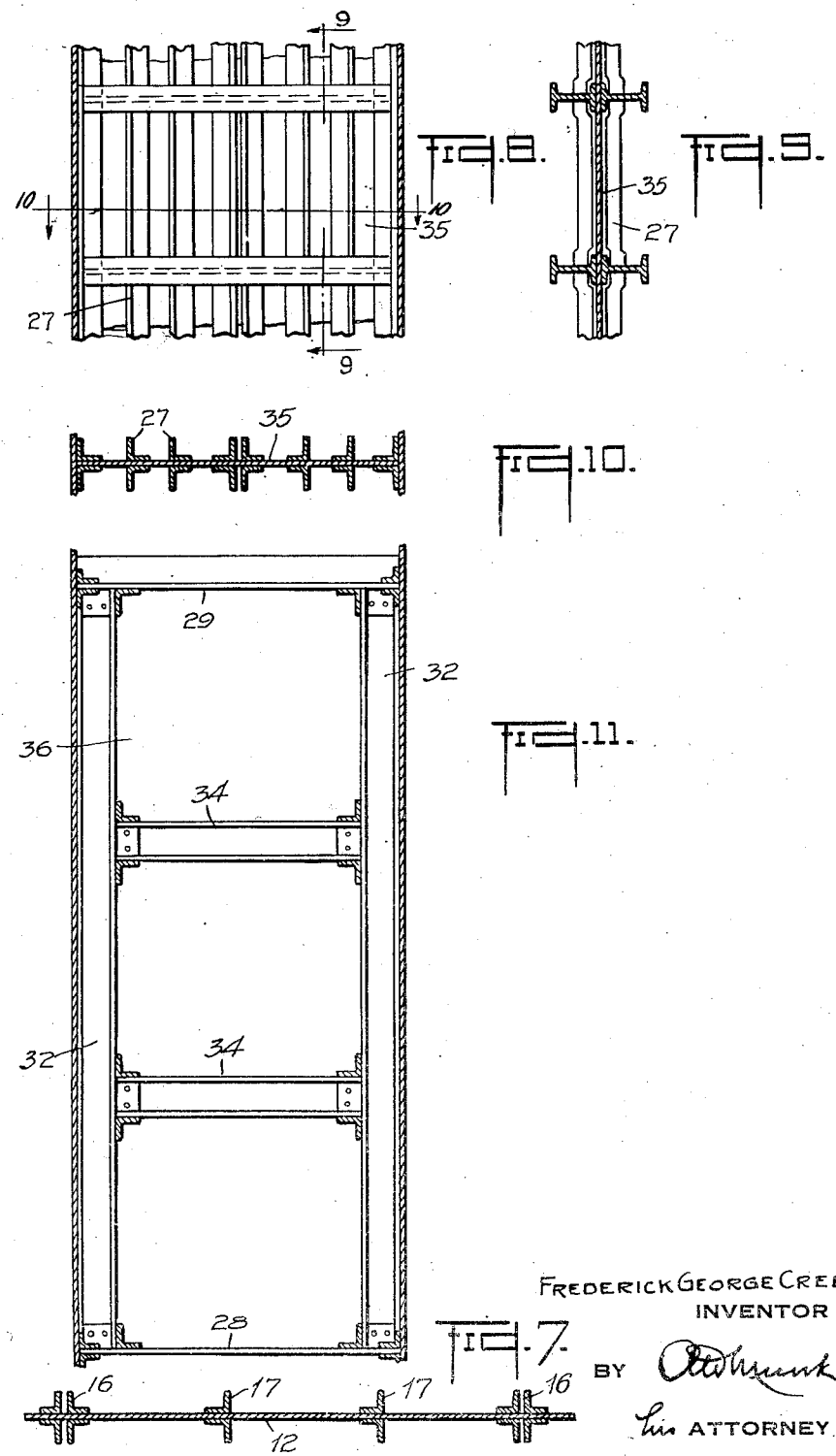

Patented Aug. 6, 1946

2,405,115

UNITED STATES PATENT OFFICE 2,405,115

FLOATING STRUCTURE

Frederick George Creed, Croydon, England, assignor to Floating Stations Limited, London, England, a company of Great Britain Application September 10, 1943, Serial No. 501,805
In Great Britain September 25, 1942

8 Claims. (Cl. 114—43.5)

This invention relates to mobile floating structures and is particularly applicable to marine aircraft carriers although it is also applicable to passenger carrying craft.

At the present time marine aircraft carriers are essentially normal ships having a clear deck space on which aircraft may land and take off. Such vessels are subject to the influence of waves in common with all known surface borne ships so that they roll and pitch. Therefore, in rough weather it is sometimes a dangerous, if not impossible, operation for aircraft to land or take off from the deck of a carrier.

In addition to the foregoing, existing aircraft carriers, like all vessels of normal construction, may easily be sunk on striking a mine or on being hit by a torpedo. Even if only damaged the carrier will list so that once again its aircraft cannot take off and land.

Existing carriers, like other ships, of normal construction, have boilers, engines, fuel and other gear below water level with the result that many of the crew may become trapped should the hull be holed below water. In addition to which waves may break over the deck or for other reasons there may be an ingress of water which makes living conditions trying and involves frequent bilge pumping. Furthermore, oil, explosives and so on cannot readily be jettisoned.

To be entirely satisfactory a marine aircraft carrier must satisfy at least the following conditions:

It must be mobile and capable of moving at a fair rate of speed so that it may keep up with other vessels with which it may sail in convoy; it must have a wide long clear deck on which aircraft may land and take off; it must have its landing deck an appreciable distance above the water; it must as far as possible be unresponsive to wave motion so that aircraft may land and take off even during rough weather; and it must be as safe as possible against torpedo attack.

Existing aircraft carriers do not satisfy the above requirements except as to mobility and speed, since the clear width of the deck is only about 60 or 70 feet while the length of the vessel may be only some seven or eight hundred feet. The landing deck is insufficiently spaced above sea level to prevent waves breaking over it and above all due to their particular construction some existing aircraft carriers roll and pitch to an even greater degree than normal surface borne vessels so that they can only be fully utilised as floating bases for aircraft during the time they are situated in relatively calm waters.

Furthermore, even a single torpedo may so damage an existing aircraft carrier that it becomes useless and may sink.

Now the object of the present invention is to provide a mobile floating structure, satisfying the above mentioned conditions for an aircraft carrier almost entirely and having further advantages which contribute to make it an eminently satisfactory marine vessel for passenger transport as well as a mobile floating base or carrier for aircraft, which is stable and steady whilst at sea.

The floating structure according to the present invention consists of a pair of parallel longitudinal buoyant bodies carrying at intervals portal structures with beam members above the water.

More particularly, the invention consists of a floating structure having a superstructure supported above wave level on elongated substantially vertical hollow supports inter-connected at intervals by frameworks forming portal structures and each mounted on a normally horizonal elongated buoyant body which is wider than the hollow supports.

In this structure as applied to an aircraft carrier, the upper surface or deck of the superstructure affords a wide long clear space for landing and taking off of aircraft and within the superstructure space is provided to serve as a hangar and for the accommodation of the flying and naval personnel, stores, machinery, both for maintenance and propulsion, etc. The hollow supports form plate girders lengthwise of the structure and the construction of the superstructure with the frameworks interconnecting the hollow supports form transverse girders interconnected therewith and suitably braced to provide a portal construction which is rigid and strong. The buoyant bodies at the lower edges of the hollow supports are preferably of circular cross section of a diameter greater than the width of the side supports or of other convenient cross section so that there is exposed an upper surface upon which may be built up a change of head of pressure which will partly counteract the change of head of pressure acting on the under surface of each buoyant body due to the subsurface wave at the point at which it is situated. The tops of the buoyant bodies are normally awash and these bodies carry the whole weight of the structure when so submerged, a reserve of buoyancy being provided by the hollow supports.

As applied to a passenger transporting vessel, the superstructure will be divided into a number of decks which with vertical divisions will form the tranversal of the portal frame, the hollow supports and buoyant bodies being the same.

The structure is arranged to be self-propelling and conveniently a propeller is arranged at each end of the buoyant body on each side whilst at the rear a rudder is associated with each buoyant body.

In order that the invention may be clearly understood and readily carried into effect, an embodiment thereof, as applied to an aircraft carrier, is hereinafter more fully described with reference to the accompanying drawings which are given for purposes of illustration only and not of limitation.

In these drawings:

Figure 1 is a perspective view of a mobile ocean-going aircraft carrier;

Figure 2 is a side elevation with part of the skin broken away to show the vertical plate girders of the portal structures which also form transverse dividing bulkheads and intermediate transverse bulkheads;

Figure 3 is a plan view with part of the deck broken away to show the transverse plate girders forming the beams of the portal structures and sub-principal interconnecting girders which help to support the flight deck;

Figure 4 is a plan view of the lower deck with part broken away to show transverse frameworks which form the lower part of the portal structures and also the principal girders interconnecting those members and serving therewith to support the lower deck;

Figure 5 is an end elevation of the front of the carrier;

Figure 6 is a transverse sectional view on an enlarged scale taken on the line VI—VI (Figures 3 and 4) showing on the right hand side the stiffeners for the walls of the supports and the longitudinal plate girders forming longitudinal bulkheads for the buoyant bodies, and showing on the left hand side one of the plate girders with its stiffeners of the portal structures which reinforce the hollow supports and divide them vertically into watertight compartments.

Fig. 7 is an enlarged sectional view taken on line 7—7 of Fig. 6; Fig. 8 is an enlarged partial view of the plate girder structure shown on the left hand side of Fig. 6;

Fig. 9 is a vertical section on line 9—9 of Fig. 8;

Fig. 10 is a horizontal cross-section taken on line 10—10 of Fig. 8, and

Fig. 11 is an enlarged partial view of the stiffener arrangement as shown on the right hand side of Fig. 6.

Referring now to the said drawings and in particular to Figure 1 thereof, the floating structure comprises a superstructure 1 the upper surface of which forms a long, wide clear space for aircraft to land on and from which to take off. The superstructure 1 is supported, with its lower surface at a level above the height of the largest wave likely to be encountered, by two elongated substantially vertical hollow caissons or supports 2, 3, each mounted for floatation on a normally horizontal elongated buoyant body 5 which is built in to form an integral structure and lies normally just below water level so as to be only slightly affected by wave motion as more fully explained later.

In the embodiment illustrated, the superstructure 1 is formed with two decks (see Figure 6), the upper of which is the flight deck 10 and the lower of which is the hangar 20. The flight deck 10 is supported on a number of regularly spaced transverse plate girders 12, which are stiffened by angle stiffeners 16, 17 (see Fig. 7) and by fore and aft beams 13 which are also spaced at regular intervals (Figure 3). The hangar deck 20 is similarly supported on equally spaced braced girders 4 and on interconnecting fore and aft beams 22.

The braced girders 4 are formed of upper members 21 which are spaced from the lower members 23 by vertical members 24 and inclined stress members 25 which are reinforced at their junctions by suitable gusset plates. The end vertical struts $24^1$, $24^{11}$, are extended up to the flight deck 10.

Along both sides of the superstructure, gun decks 11 are provided and the side edges of the flight deck 10 are extended to overhang the gun decks 11 to afford a measure of protection for the gunners whilst providing ample space for the mountings of the guns 18, a number of which are provided along both of the gun decks as indicated in the drawings.

The upper and lower surfaces of the superstructure which come together at both front and rear ends are well rounded at their junctions substantially as shown (Figures 1 and 2) to offer reduced resistance to wind.

Two lifts 55, 56 are provided near the front and two further lifts 57, 58 are provided near the rear for the purpose of transferring aircraft between the flight deck 10 and the hangar deck 20. The flight deck will be furnished with arrester lines and other equipment customary on the decks of aricraft carriers and also in accordance with usual practice an "island" 59 is provided on the starboard side to contain the navigating bridge, fire control tower, funnel and so on.

The hollow supports 2, 3 are parallel sided throughout the greater part of their length and are tapered at their front and rear (Figure 5). The surface plates of the hollow supports are flat and are secured to vertical plate girders 35 which extend from the top to the bottom of each hollow support at intervals equal to the spacing of the plate girders 12. These plate girders 35 form bulkheads which are stiffened by bulb angles 27 some of which are vertical and others horizontal (see Figs. 8 to 10), whilst those nearer to the water level are more closely spaced for greater strength (see left hand side of Figure 6). The surfaces are also stiffened by vertically extending bulb angles or other stiffeners 32 which are connected together by transverse members 34 (Figure 6—right hand side and Fig. 11) at points intermediate the bulkheads 35. The lower ends of each of the supports 2, 3 are closed off and made watertight by a horizontal bulkhead 28 formed by a plate girder extending throughout the length thereof, whilst the assembly is further strengthened and made more seaworthy by the provision of a similar horizontal bulkhead 29 extending along the length of each support 2, 3 and forming a plate girder approximately half way up its height. The supports 2, 3 are additionally divided transversely by bulkheads 36 which are positioned intermediate the plate girders 35 and extend between the bulkheads 28 and 29. The supports 2, 3 are in this way divided into a number of watertight compartments. The additional transverse bulkheads 36 (Figure 2) are also stiffened by bulb angles similarly to those on the main bulkheads.

The plate girders 12 form the transverse beams and the aligned plate girders 35 form the upright line legs of transverse portal structures braced by the members 24¹, 24¹¹, 31 and 33. The ends of each braced girder 4 are built onto the two plate girders 35 of a portal structure and greatly increase the strength and rigidity of the latter. The surface plates of the hollow supports form vertical plate girders at right angles to the vertical plate girders 35 in a structure further made rigid by the horizontal plate girders 28, 29.

The buoyant body 5, at the lower extremity of the hollow support 2, 3 is of elongated tubular form which tapers at each end and is composed of curved plates, conveniently of uniform size and curvature, which are strengthened and stiffened by bulb angles. Each buoyant body 5 is divided lengthwise by a horizontal plate girder 43 forming also a watertight bulkhead and also by two vertical plate girders or bulkheads 41, 42 extending between the surface plate and the plate girders 43 so providing four watertight compartments which are divided transversely by lateral bulkheads 44, 45, 46, 47 which are situated at the points where the hollow supports 2, 3 are provided with the vertical bulkheads 35 and 36 (see Figures 2 and 6). These bulkheads like those previously referred to are stiffened by bulb angles 48, which are substantially similar to the vertical bulb angles 27 shown in Figs. 8 to 10. The buoyant bodies 5 have therefore a very large number of watertight compartments formed with walls of robust construction.

The various stiffeners may be secured to the sides of the hollow bodies and to the bulkheads in any convenient manner, for instance by welding, as shown in Figs. 7 to 10 or by riveting as shown in Fig. 11.

The buoyant bodies 5 are only required to contain the propeller shafts and final power transmission and for the remainder only serve as ballast tanks for use, for example, when it is desired to sink them to a lower level during rough weather and, if desired, for fuel storage or similar purpose.

The buoyant bodies 5 may be some twenty-eight feet in diameter and the supports 2, 3 some twelve feet in width, in which case their centres are spaced apart a distance of the order of one hundred and forty feet. The overall height from the flight deck 10 to the bottom of the buoyant bodies 5 is of the order of one hundred and thirteen feet and the overall length of the structure is of the order of one thousand feet. The total width of the superstructure may be some one hundred and eighty feet whilst the clear width of the flight deck 10 may be some one hundred and forty feet and the width of the gun decks 11 some twenty-five feet of which twenty feet are clear over-head. The above dimensions will vary for different sizes of vessels but will be of substantially the same relative proportions.

Due to the wide spacing of the supports 2, 3 and the buoyant bodies 5, the structure will be inherently stable and will resist rolling since rolling will occur about an axis therebetween. For one buoyant body to rise will mean that the other must sink a corresponding extent which will be resisted by its buoyancy augmented by the reserve buoyancy of the hollow support above it, whilst if the one buoyant body is forced to sink it will try and lift the other buoyant body out of the water. In addition, wave motion affects the buoyant bodies 5 to a less than normal extent and there is therefore little tendency for the one buoyant body to affect the other. This reduction in wave effect is due to the creation of a change of head of pressure on the upper surface of each buoyant body at each side of the hollow support above it due to the wave at the height at which that surface is situated, which change of head of pressure tends to sink the buoyant body. At the same time, however, the same wave creates a change of head of pressure on the undersurface of the buoyant body which tends to lift it. As the effective undersurface of the buoyant body is at an average more than twenty feet deeper in the water, the wave at that depth is much smaller and the change of head of pressure is less. The head of pressure built up on the upper surface of the buoyant body acts against the upthrust on the undersurface thereon. Due to the fact that it is necessary for the supports 2, 3 to have a reserve buoyancy it is not practical to arrange for the changes of head of pressure acting on the buoyant bodies to cancel one another entirely but the building up of the head of pressure on the upper surface will to a great extent reduce the lift due to the change of head of pressure caused by the passage of a wave on the lower surface of the buoyant body. The considerable length of the structure reduces to a minimum any possibility of pitching which is further reduced by the reduced effect which the waves have on the buoyant bodies 5. The floating structure is therefore much steadier than known vessels particularly in heavy seas as it is not possible to reduce the effect of wave motion on ships of normal construction.

The sides of the superstructure are covered in and the skin here may be strengthened by girders 50 (Figure 6). Girder stays 51 extend from the lowermost side extremities of the superstructure and conveniently from the points where the girders 50 are situated down to the plate girders 35 within the side supports 2, 3. The spaces between the girders 51 may be closed in to form triangular section tanks 52 extending along the sides of the superstructure and serving as ballast tanks which may be used to assist in reducing rolling movement by pumping water into these tanks and by connecting the tanks across ship to form anti-rolling tanks and also for trimming the craft should it tend to list due to flooding of some of the watertight compartments of the buoyant bodies 5 such as from damage thereto by a mine or torpedo.

The floating structure may, by the provision of sufficiently powerful engines, be propelled at a fair average rate of say some ten to fifteen nautical miles per hour in moderate weather when the upper surfaces of the buoyant bodies 5 will be just awash or very slightly below water level as indicated by the lines A—A in Figure 6. During rough weather, in order to take advantage of the calmer conditions prevailing below the surface of the water, the buoyant bodies 5 are sunk to a lower level so that their upper surfaces are say some ten feet below water level which is here indicated by the lines B—B. The buoyant bodies 5 are then only subject to the effect of the subsurface waves at that level so that in spite of the larger waves the structure will be almost as steady as in more moderate weather although its rate of progress is somewhat reduced on account of its increased displacement.

For the purpose of propelling the craft, propellers 60 are provided at one or as illustrated at both ends of the buoyant bodies 5 and are driven from engines contained within the superstructure. A rudder 61 is provided at the aft end of each of the buoyant bodies.

The engines, boilers, fuel and other machinery are contained entirely within the compass of the superstructure within which is also accommodation for the flying and naval personnel as well as for stores, auxiliary equipment, machinery, boilers, and so on. As the lower level of the superstructure is supported above the highest wave there will be no ingress of water due either to waves or to damage so that the living conditions are better than in normal ships and much safer as the personnel are all above water level.

With a construction as defined above there is a wider and longer landing deck than is possible with aircraft carriers as previously constructed so that more, and if desired larger or faster, aircraft can be carried. The carrier is, or is nearly as, mobile as present carriers but as already stated it is much steadier and far less affected by waves than is a normal carrier. In addition, the carrier is less liable to loss by the action of bombs, mines and torpedoes because owing to the large number of watertight compartments many mines or torpedoes can damage the normally horizontal buoyant bodies without reducing their buoyancy to an extent which cannot be stabilised by flooding undamaged portions of one or both of the buoyant bodies with or without the aid of the ballast tanks, whilst explosions in the water close to the buoyant bodies will have little or no effect as there is no plane surface on which the concussion can take effect. In the case of bombs, unless these explode on contact there is a possibility that they will pass through the superstructure between the supports to explode in the water therebelow. In any case means may be provided in the customary manner for reducing the effect of bomb blast.

The flight deck 10 is situated higher above water level than is possible with existing types of aircraft carriers and it is also longer and wider which makes for easier take off and landing. Also, with this structure, there are facilities for easy and rapid handling of the aircraft which may be taken down to the lower deck by either or both lifts 55, 56 at the front and similarly brought up to the flight deck at the rear by the two lifts 57, 58, all of which lifts are wide enough to take aircraft with their wings spread. During movement along the hangar deck the aircraft may be fueled, bombed-up, loaded with ammunition and serviced without being turned round.

There will be natural drainage and spilled oil, petrol and water may be discharged by gravity instead of passing into the hull as in the case of existing carriers. Likewise, jettisoning of unwanted material may easily be accomplished.

Ventilation may be by updraught from below the superstructure so that complicated air conditioning and the need for ventilators in the upper deck are avoided.

Finally, due to its shape and arrangement the structure may be made easily from standard structural sections so that its components may be fabricated quickly and at relatively small cost and certainly more quickly and cheaply than existing floating structures suitable for use as aircraft carriers.

Whilst the invention has been described above in terms of an aircraft carrier, the invention is also eminently suitable for a passenger transport due to its steadiness at sea and other advantages mentioned above, in which case the superstructure may contain a number of decks giving comfortable well-ventilated accommodation for a large number of persons.

I claim:

1. A marine vessel including a pair of spaced parallel elongated hollow buoyant bodies, a number of portal frames mounted on said buoyant bodies, each of said portal frames including two upright plate girders forming legs and a transverse plate girder forming a beam connecting said legs at the top thereof, a superstructure including more than one deck built around the transverse beams of said portal frames, a braced open girder extending between the legs of each of said portal frames below said superstructure, plates secured to said legs of said portal frames to form hollow caissons extending upwardly from said buoyant bodies and having a transverse width less than that of the latter, and horizontal plate girders between the legs of adjacent portal frames within each caisson, the legs of said portal frames and said horizontal plate girders forming bulkheads dividing the caissons into watertight compartments.

2. A marine vessel including two spaced parallel taper-ended elongated hollow bodies, a horizontal plate girder extending throughout the length of each hollow body, at least one vertical plate girder extending throughout the length of each hollow body, transverse bulkheads within each of said hollow bodies and serving with said horizontal and vertical plate girders to divide them into a large number of watertight compartments, spaced portal frames mounted on said hollow bodies, each of said portal frames including two upright plate girders forming legs and a transverse plate girder forming a beam connecting said legs at the top thereof, a superstructure including more than one deck built around the transverse beams of said portal frames, a braced open girder extending between the legs of each of said portal frames below said superstructure, plates secured to said legs of said portal frames to form hollow caissons extending upwardly from said hollow bodies and having a transverse width less than that of the latter, and horizontal plate girders within said caissons extending between the legs of adjacent portal frames to form therewith bulkheads dividing the caissons into watertight compartments.

3. A marine vessel including two spaced parallel taper-ended elongated hollow bodies of circular cross-section, a horizontal plate girder extending throughout the length of each hollow body, a pair of spaced vertical plate girders extending throughout the length of each hollow body, a number of transverse bulkheads within each of said hollow bodies and serving with said horizontal and vertical plate girders to divide them into a large number of watertight compartments, spaced portal frames mounted on said hollow bodies, each of said portal frames including two upright plate girders forming legs and a transverse plate girder forming a beam connecting said legs at the top thereof, a superstructure including more than one deck built around the transverse beams of said portal frames, a braced open girder extending between the legs of each of said portal frames below said superstructure, plates secured to said legs of said portal frames to form flat sided hollow caissons extending upwardly from said hollow bodies and having a transverse width less than that of the latter, said caissons tapering at their ends, horizontal plate girders within said caissons extending between the legs of adjacent portal frames to form therewith bulkheads dividing the caissons into watertight compartments, a propeller at each end of each of said hollow bodies, means within said superstructure for driving said propellers, and a rudder at one end of each of said hollow bodies.

4. A floating structure comprising a pair of submerged elongated buoyant bodies arranged with their longitudinal axes extending parallel to each other normally in a horizontal plane, two elongated hollow chambers each erected directly on one of said buoyant bodies, the transverse thickness of said chambers being less than that of said buoyant bodies, girder frameworks interconnecting said hollow chambers at spaced intervals, and a superstructure supported by said girder frameworks above maximum wave level.

5. A floating structure, as claimed in claim 4, in which said buoyant bodies are spaced apart a distance equal to at least four times their transverse width.

6. A floating structure, as claimed in claim 4, in which said girder frame-works are portal frames each including two upright legs disposed in and extending throughout the height of said two hollow chambers, respectively so as to form structural reinforcements of the latter, and transverse beams connecting said legs at their upper ends, said superstructure being supported on said transverse beams of said portal frames.

7. A floating structure, as claimed in claim 4, in which said buoyant bodies are cylindrical in shape.

8. A floating structure, as claimed in claim 4, in which said buoyant bodies are cylindrical in shape and tapered at their ends.

FREDERICK GEORGE CREED.